United States Patent
Shikii et al.

(10) Patent No.: US 9,244,329 B2
(45) Date of Patent: Jan. 26, 2016

(54) LIGHT DEFLECTOR, METHOD OF MANUFACTURING LIGHT DEFLECTOR, AND LIQUID CRYSTAL DISPLAY

(71) Applicant: Panasonic Corporation, Osaka (JP)

(72) Inventors: Shinichi Shikii, Nara (JP); Takashi Osako, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 82 days.

(21) Appl. No.: 14/130,990

(22) PCT Filed: Jun. 5, 2013

(86) PCT No.: PCT/JP2013/003520
§ 371 (c)(1),
(2) Date: Jan. 6, 2014

(87) PCT Pub. No.: WO2013/183288
PCT Pub. Date: Dec. 12, 2013

(65) Prior Publication Data
US 2014/0160383 A1    Jun. 12, 2014

Related U.S. Application Data

(60) Provisional application No. 61/656,562, filed on Jun. 7, 2012.

(51) Int. Cl.
*G02F 1/1335* (2006.01)
*G02F 1/29* (2006.01)
(Continued)

(52) U.S. Cl.
CPC *G02F 1/29* (2013.01); *G02B 5/045* (2013.01); *G02B 26/0841* (2013.01);
(Continued)

(58) Field of Classification Search
CPC ... G02B 5/045; H04N 13/042; H04N 13/0418
USPC .......................................................... 349/15
See application file for complete search history.

(56) References Cited

U.S. PATENT DOCUMENTS 6,169,594 B1    1/2001    Aye et al.
6,469,683 B1    10/2002   Suyama et al.
(Continued)

FOREIGN PATENT DOCUMENTS

JP    02-140067    *    5/1990    ............. H04N 5/225
JP    7-98439              4/1995
(Continued)

OTHER PUBLICATIONS

International Search Report issued Aug. 13, 2013 in corresponding International Application No. PCT/JP2013/003520.

*Primary Examiner* — Sang V Nguyen
(74) *Attorney, Agent, or Firm* — Wenderoth, Lind & Ponack, L.L.P.

(57) ABSTRACT

A light deflector which deflects incident light and emits the deflected light, by changing a refractive index of a liquid crystal: a pair of ITO films; a plurality of prisms which are provided between the pair of transparent electrodes and are arranged on a facing surface of one of the pair of transparent electrodes, the facing surface facing a surface of the other one of the pair of transparent electrodes; two spacers arranged between the pair of transparent electrodes, and having, in a direction from one of the pair of transparent electrodes toward the other, widths which (i) are greater than widths of the prisms and (ii) are identical to each other; and a liquid crystal which is provided, within a space between the pair of transparent electrodes, in a portion other than a portion where the prisms and the two spacers exist.

10 Claims, 13 Drawing Sheets

(51) Int. Cl.
*G02B 5/04* (2006.01)
*G02B 26/08* (2006.01)
*G02B 27/22* (2006.01)
*H04N 13/04* (2006.01)
*G02F 1/1339* (2006.01)
*F21V 8/00* (2006.01)
*G02F 1/1341* (2006.01)

(52) U.S. Cl.
CPC ....... *G02B 27/2264* (2013.01); *G02F 1/13394* (2013.01); *H04N 13/042* (2013.01); *H04N 13/0418* (2013.01); *G02B 6/0053* (2013.01); *G02F 1/1335* (2013.01); *G02F 2001/13415* (2013.01)

(56) References Cited

U.S. PATENT DOCUMENTS

| | | | |
|---|---|---|---|
| 6,501,526 B1* | 12/2002 | Oh | 349/155 |
| 6,714,174 B2 | 3/2004 | Suyama et al. | |
| 6,778,248 B1* | 8/2004 | Ootaguro | G02F 1/13394 349/153 |
| 7,209,097 B2 | 4/2007 | Suyama et al. | |
| 7,336,244 B2 | 2/2008 | Suyama et al. | |
| 2002/0047837 A1* | 4/2002 | Suyama et al. | 345/204 |
| 2004/0160389 A1 | 8/2004 | Suyama et al. | |
| 2004/0164927 A1 | 8/2004 | Suyama et al. | |
| 2004/0257518 A1* | 12/2004 | Jang et al. | 349/155 |
| 2008/0094559 A1* | 4/2008 | Lee et al. | 349/143 |
| 2008/0246837 A1* | 10/2008 | Schultz | H04N 13/0404 348/51 |
| 2011/0080554 A1 | 4/2011 | Toko | |
| 2011/0234572 A1* | 9/2011 | Toko | G02F 1/292 345/211 |
| 2012/0287037 A1* | 11/2012 | Shikii et al. | 345/156 |
| 2013/0057806 A1* | 3/2013 | Kanemitsu et al. | 349/64 |

FOREIGN PATENT DOCUMENTS

| | | |
|---|---|---|
| JP | 10-48597 | 2/1998 |
| JP | 2002-523802 | 7/2002 |
| JP | 2003-66467 | 3/2003 |
| JP | 2005-91743 | 4/2005 |
| JP | 2011-81985 | 4/2011 |
| JP | 2011-203546 | 10/2011 |
| JP | 2011-207271 | 10/2011 |
| WO | 00/11515 | 3/2000 |
| WO | 2012/066778 | 5/2012 |

* cited by examiner

FIG. 4
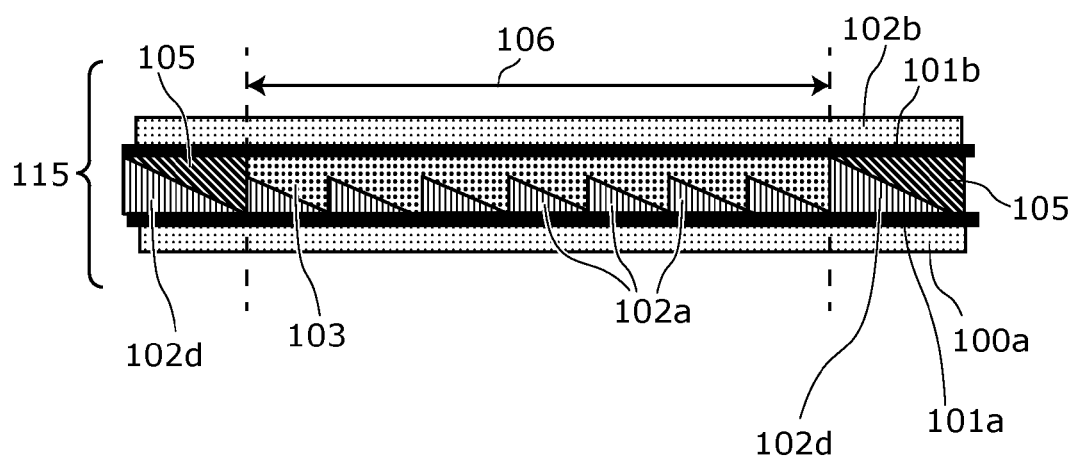
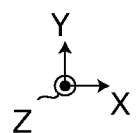

FIG. 7
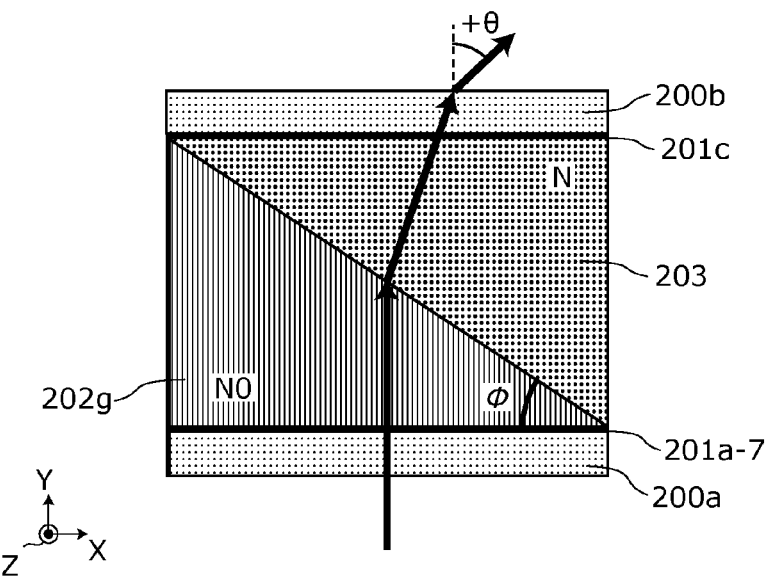
(a)
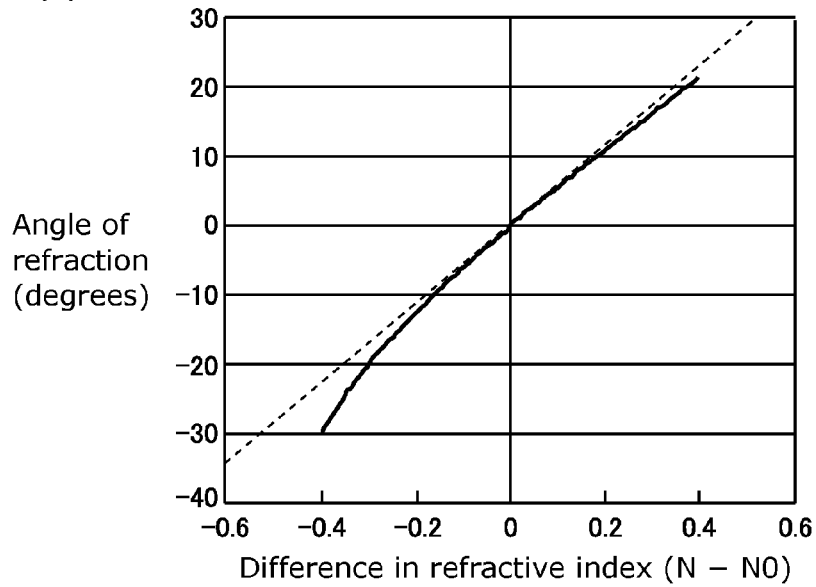
(b)

FIG. 9
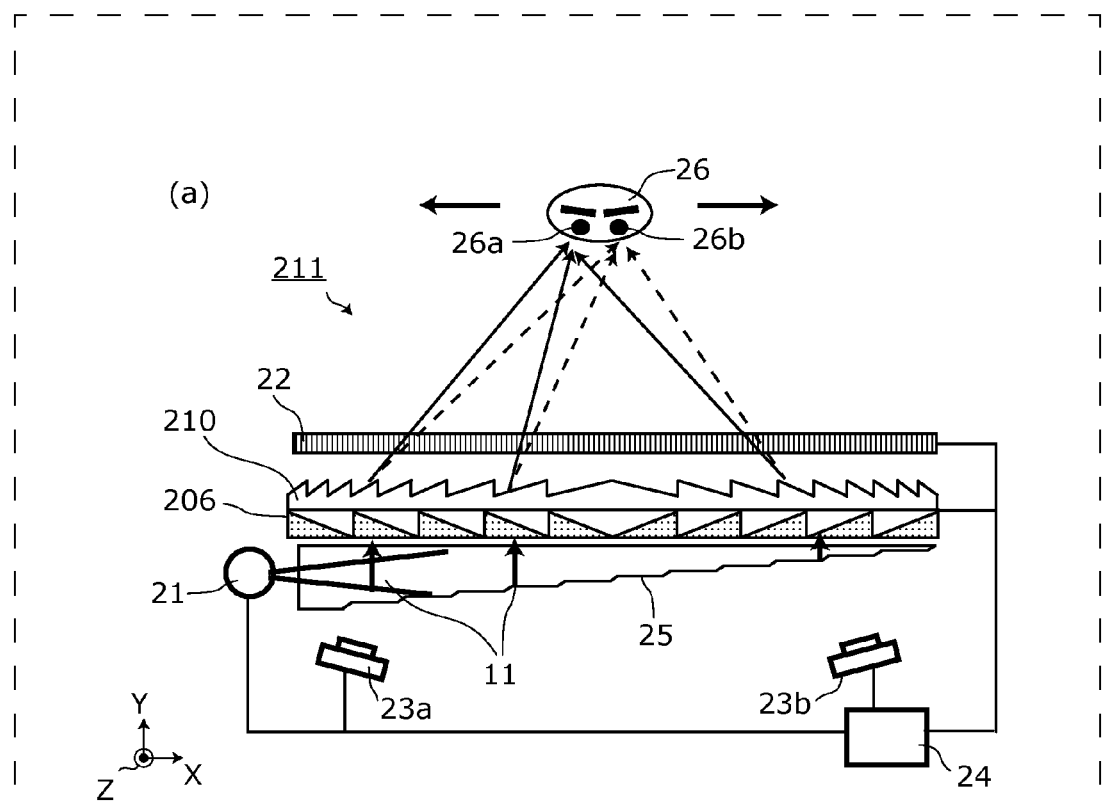
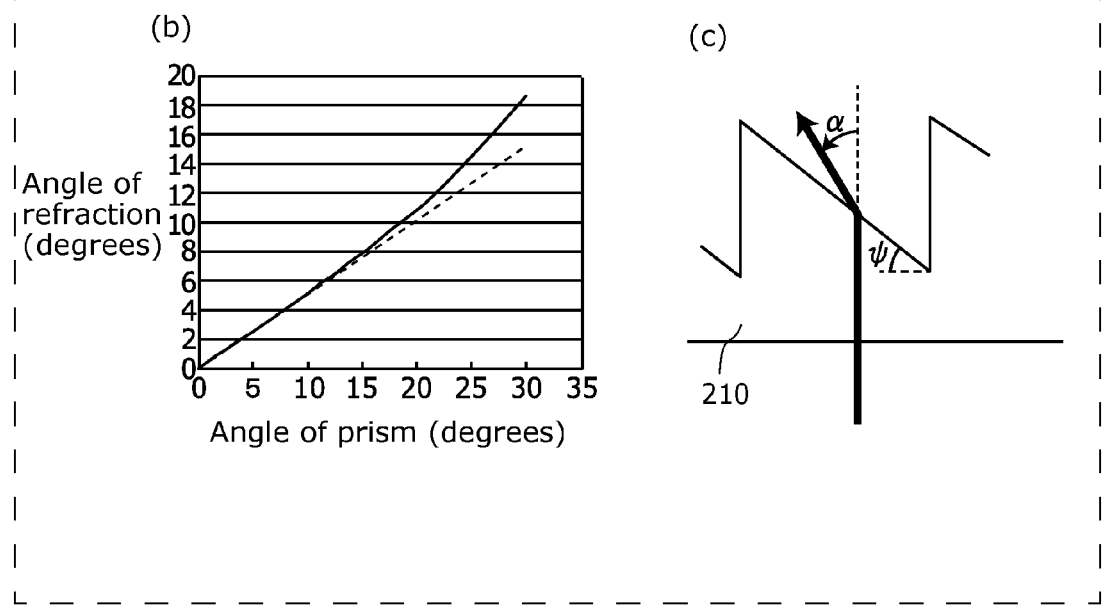

FIG. 11
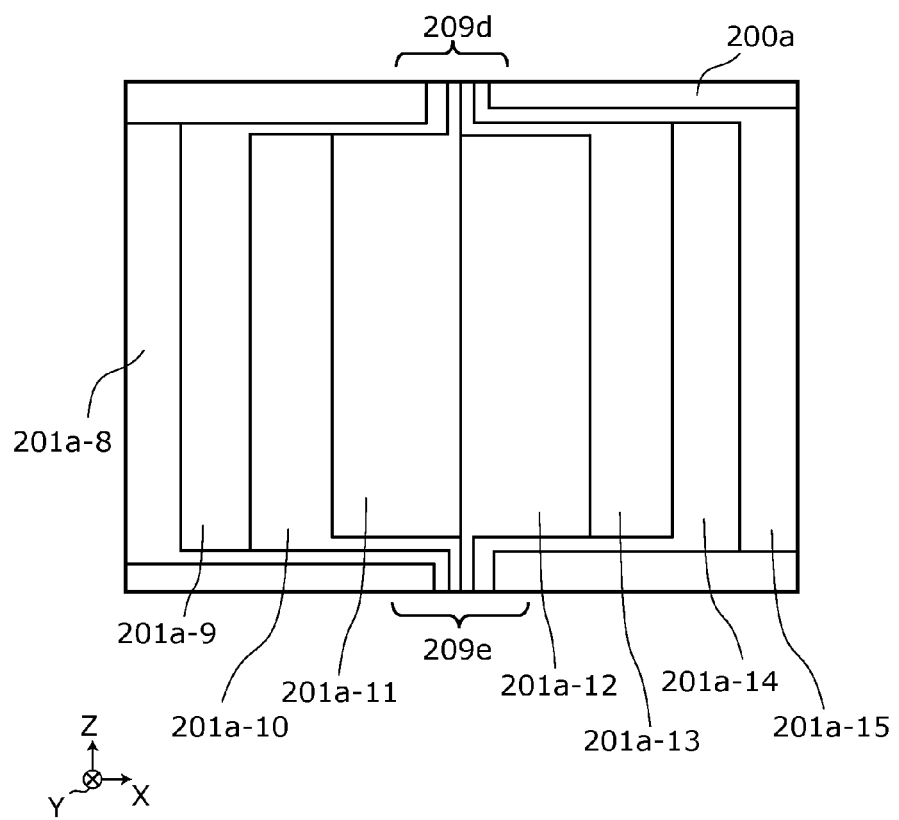
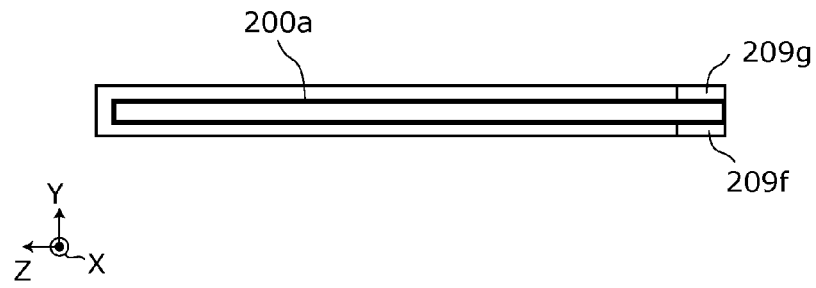

LIGHT DEFLECTOR, METHOD OF MANUFACTURING LIGHT DEFLECTOR, AND LIQUID CRYSTAL DISPLAY

TECHNICAL FIELD

The present invention relates to a light deflection element which deflects incident light, a method of manufacturing the light deflection element, and a liquid crystal display which uses the light deflection element.

BACKGROUND ART

A light deflector which does not include a movable part, and uses an electrical liquid crystal deflector that utilizes a variation in refractive index of a liquid crystal caused by application of a voltage has been proposed (patent literature (PTL) 1).

A three dimensional (3D) stereoscopic image display device using the above-described light deflector has been proposed (PTL 2).

CITATION LIST

Patent Literature

[PTL 1]
Japanese Unexamined Patent Application Publication (Translation of PCT Application) No. 2002-523802
[PTL 2]
Japanese Unexamined Patent Application Publication No. 2011-81985
[PTL 3]
Japanese Unexamined Patent Application Publication No. H7-98439

SUMMARY OF INVENTION

Technical Problem

However, in a light deflector manufactured with a one drop filling method (ODF method), it is difficult to spread a liquid crystal into a planer shape having a uniform surface.

In view of this, the present invention provides a light deflector having a configuration which makes it possible to spread a liquid crystal into a planer shape having a uniform surface.

Solution to Problem

A light deflector according to an aspect of the present invention deflects incident light and emits the light which has been deflected, by changing a refractive index of a liquid crystal, the light deflector including: a pair of transparent electrodes which face each other; a plurality of prisms which are provided between the pair of transparent electrodes and are arranged on a facing surface of one of the pair of transparent electrodes, the facing surface facing a surface of the other one of the pair of transparent electrodes; two spacers arranged between the pair of transparent electrodes, and having, in a direction from one of the pair of transparent electrodes toward the other of the pair of transparent electrodes, widths which (i) are greater than widths of the prisms and (ii) are identical to each other; and a liquid crystal which is provided, within a space between the pair of transparent electrodes, in a portion other than a portion where the prisms and the two spacers exist.

Advantageous Effects of Invention

A light deflector according to the present invention has a configuration which makes it possible to spread a liquid crystal into a planer shape having a uniform surface.

BRIEF DESCRIPTION OF DRAWINGS

FIG. 4 is a schematic configuration diagram of the light deflector according to Embodiment 1.

FIG. 7 shows diagrams illustrating a relationship between difference in refractive index and an angle of refraction of a light deflector.

FIG. 9 shows a conceptual diagram of a liquid crystal display device which uses a Fresnel lens according to Embodiment 2, and diagrams illustrating a relationship between an angle of prism and an angle of refraction.

FIG. 11 schematically shows third wiring diagrams of the ITO film used in the light deflector according to Embodiment 2.

DESCRIPTION OF EMBODIMENTS

Underlying Knowledge Forming Basis of the Present Invention

The inventors of the present invention have found that a light deflector described in the "Background Art" section has the following problems.

Conventionally, various studies have been conducted on a light deflector which deflects light. The light deflector is an essential device, for example, for a laser scanner which is used in a laser printer or the like. Conventionally, a polygon scanner, a galvanometer scanner, an MEMS mirror, or the like has been used as the light deflector. However, although the polygon scanner, the galvanometer scanner, the MEMS mirror, or the like can deflect light at large angle, such a light deflector includes a movable part, which can often be a cause for failure. In view of this, development of a light deflector which does not include a movable part and can electrically perform scanning is desired for applications other than for the above-described laser printer and the like as well.

To satisfy the demand, as described in PTL 1 described below, a light deflector which does not include a movable part, and uses an electrical liquid crystal deflector that utilizes a variation in refractive index of a liquid crystal caused by application of a voltage has been proposed. With this, the light can be deflected just by applying a voltage without using a movable part. This makes it possible to configure a light deflector with a high reliability. A principle of a light deflector 10 is described with reference to FIG. 1.

Figure 1:
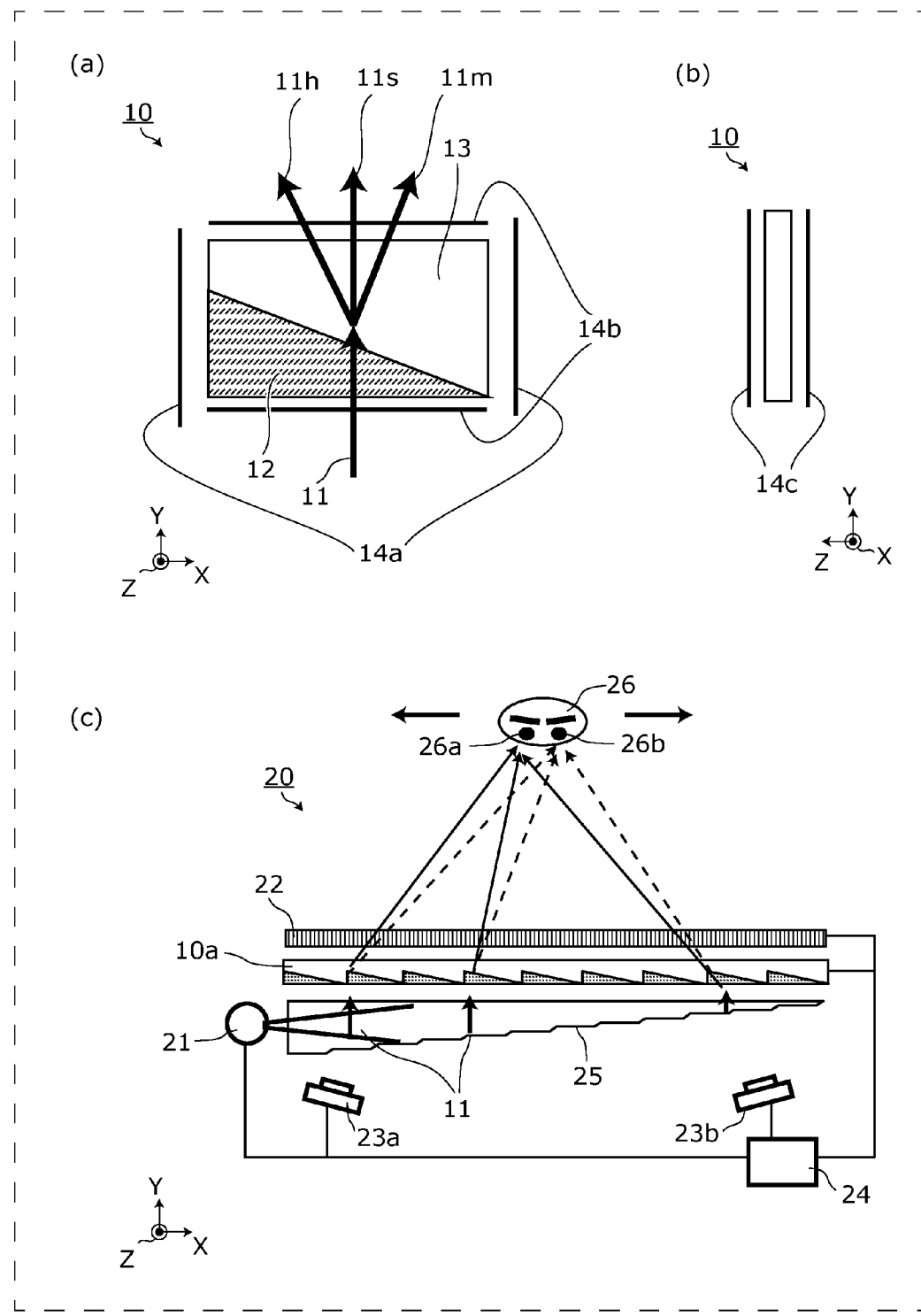
FIG. 1 shows a plan view and a lateral view of a light deflector according to a related technique, and a schematic diagram of a liquid crystal display device.

(a) and (b) in FIG. 1 respectively show a front view and a lateral view of the light deflector 10 according to a technique (related technique) disclosed in PTL 1. The light deflector 10 includes: a liquid crystal 12, a dielectric 13, and electrodes 14a, 14b, and 14c.

The liquid crystal 12 has a triangle-shaped cross-section.

The dielectric 13 has a complementary shape in opposite orientation relative to the triangular liquid crystal 12, and is disposed in contact with the liquid crystal 12. The dielectric 13 may include, for example, a polymeric resin, such as plastic, or glass.

The electrodes 14a, 14b and 14c are electrodes for applying a voltage to the liquid crystal 12 and the dielectric 13. It is desirable that an electrode (the electrode 14a in FIG. 1) through which the light that enters the liquid crystal 12 and the dielectric 13 passes be a transparent electrode.

Although the electrodes in FIG. 1 includes three pairs of electrodes, namely, the electrodes 14a, 14b and 14c, the electrodes may include only any one pair of the electrodes.

Light 11 incidents on the light deflector 10 from the underside in the figure of the liquid crystal 12. Assuming that a refractive index NL of the liquid crystal 12 and a refractive index ND of the dielectric 13 are the same in a state where a voltage is not applied to the liquid crystal 12, the light 11 travels in the direction of light 11s without being refracted at the boundary surface between the liquid crystal 12 and the dielectric 13. When a voltage is applied between the electrodes, and the refractive index NL of the liquid crystal 12 becomes higher than the refractive index of the dielectric ND, the light 11 is refracted in the direction of light 11h. Furthermore, when the refractive index NL of the liquid crystal 12 becomes smaller than the refractive index of the dielectric ND, the light 11 is refracted in the direction of light 11m. In this manner, the light deflector 10 can deflects the incident light 11. When a plurality of such elements are arranged in a lateral direction as described in PTL 1, it is possible to configure a light deflector which is capable of deflecting, in an arbitrary direction, a wide range of light.

This light deflector does not include a movable part, which produces an advantageous effect that the light deflector is less affected by vibrations or the like, even when, as described in PTL 2, this light deflector is used to change the illuminating direction of planar light, such as the light of a headlight of a car.

Furthermore, using the above-described light deflector, a three dimensional (3D) stereoscopic image display device, such as the one shown in PTL 3, has been proposed. The 3D stereoscopic image display device shown in PTL 3 can be configured, based on the light deflector 10, as a liquid crystal display device 20 shown in (c) in FIG. 1. The liquid crystal display device 20 includes: a light deflector 10a in which a plurality of the light deflectors 10 are arranged; a light source 21; a liquid crystal panel 22; stereo cameras 23a and 23b; a control unit 24; and a light guide plate 25. The liquid crystal panel 22, the light deflector 10a, the light source 21, and the stereo cameras 23a and 23b are connected to the control unit 24. The light 11 which is emitted by the light source 21 enters through a side surface of the light guide plate 25 and propagates through the light guide plate 25, and directed in an approximately vertical direction by the prism shape provided on the base and then exits from the light guide plate 25. The light 11 which enters the light deflector 10a approximately vertically is deflected at different angles corresponding to the positions at predetermined timings to be converged at a right eye 26a of a viewer 26, by cells of the light deflector 10a. Synchronously with this timing, a right-eye image is displayed on the liquid crystal panel 22. In a timing later than the above-described predetermined timing, the light 11 is deflected at an angle different for each location to be converged at a left eye 26b. Synchronously with this timing, a left-eye image is displayed on the liquid crystal panel 22. The right-eye image and the left-eye image are alternately switched at predetermined time intervals (for example, 8.3 milliseconds that is 120 Hz when converted into frequency). This makes it possible for the viewer 26 to recognize images displayed on the liquid crystal panel 22 as three dimensional (3D) images. Furthermore, when an identical image is displayed on the liquid crystal panel as a right-eye image and a left-eye image, the image is recognized as a two-dimensional (2D) image. However, persons other than the viewer 26 cannot recognize the image, and thus the liquid crystal display device can be configured as a "privacy display". Furthermore, positions of both eyes of the viewer 26 are recognized with the stereo cameras 23a and 23b. In this manner, even when the position of the viewer 26 changes, the right-eye image can keep converging at the right eye, and the left-eye image can keep converging at the left eye by adjusting a deflection angle of the light deflector 10a with a signal from the control unit 24. With this, even when the viewing position changes, the liquid crystal display device can keep functioning as the privacy display or the 3D display. Different images may be displayed on the liquid crystal panel 22 corresponding to a viewing position, as a matter of course.

However, when a one drop filing method (ODF method) is used to manufacture this light deflector, it is difficult for a liquid crystal to go beyond a wall of a prism, for example, when the dielectric 13 in FIG. 1 is arranged in an array. As described, in the case of the light deflector manufactured using the ODF method, it is difficult to spread a liquid crystal into a planer shape having a uniform surface.

In view of this, the present invention provides a light deflector having a configuration in which the liquid crystal can be spread into a planer shape having a uniform surface. Furthermore, the present invention makes it possible for the liquid crystal to flow uniformly without a gap using a simple method, without deteriorating deflection capability of light.

In order to solve such a problem, a light deflector according to an aspect of the present invention deflects incident light and emits the light which has been deflected, by changing a refractive index of a liquid crystal, the light deflector including: a pair of transparent electrodes which face each other; a plurality of prisms which are provided between the pair of transparent electrodes and are arranged on a facing surface of one of the pair of transparent electrodes, the facing surface facing a surface of the other one of the pair of transparent electrodes; two spacers arranged between the pair of transparent electrodes, and having, in a direction from one of the pair of transparent electrodes toward the other of the pair of transparent electrodes, widths which (i) are greater than widths of the prisms and (ii) are identical to each other; and a liquid crystal which is provided, within a space between the pair of transparent electrodes, in a portion other than a portion where the prisms and the two spacers exist.

With this, in a manufacturing process of a light deflector, the spacer regulates the space between transparent electrodes of the light deflector not to be smaller than a predetermined width and height. Then, a liquid crystal material is placed at a position between the spacers. With this, the liquid crystal material is spread to form a planar surface between the transparent electrodes to form a uniform liquid crystal in a planar shape. Therefore, the light deflector has a configuration which makes it possible to uniformly spread the liquid crystal into a planer shape.

For example, the two spacers may be two prisms.

With this, a member which has an identical function as the function of the prisms that are arranged between the light deflector and the transparent electrode to deflect incident light, and has a greater height than the prisms can be used as the spacer. Since the spacer itself is a prism (having a function of a prism), the spacer can deflect incident light in a similar manner as the other prisms. Thus, it is possible to eliminate change in deflection properties of the light deflector caused by arrangement of the spacers.

For example, each of the prisms may have a shape similar to a shape of each of the two spacers.

With this, the spacer which is a prism can have same deflection properties as the other prisms. As a result, when the transparent electrode applies a voltage to the liquid crystal, the spacer can deflect incident light in a same manner as other prisms.

For example, the light deflector may further comprise a sealing agent which seals an edge of the pair of transparent electrodes, and each of the two spacers may be disposed at a position in contact with the sealing agent.

With this, the spacer can be provided in a portion of the sealing agent, which is attached to prevent the liquid crystal (liquid crystal material) from leaking outside the light deflector. When the sealing agent is located in an area different from the active area of the liquid crystal, such area is a portion not visible to the viewer. Thus, even when the spacer is present in such an area, deflection properties of the light deflector is not changed, and the light deflector has the same deflection properties as the case where the spacer is not present.

For example, each of the prisms may have a symmetrical shape with respect to an axis of symmetry which is parallel to a normal to the facing surface.

With this, when a transparent electrode is disposed after the liquid crystal (liquid crystal material) is dropped on the position of the axis of symmetry, the liquid crystal can spread in a direction away from the axis of symmetry.

For example, it may be that each of the prisms has a stick-like shape and has a right triangle-shaped cross-section, and a non-hypotenuse side of the right triangle is in contact with the facing surface, and a side closer to the axis of symmetry out of two sides different from the non-hypotenuse side is the hypotenuse.

With this, the liquid crystal can spread in the direction away from the axis of symmetry, by climbing the hypotenuse of the right triangle. Thus, the liquid crystal spreads more uniformly, and the liquid crystal having a uniform planar surface is formed.

For example, in a cross-section parallel to a base, the axis of symmetry may be at a position penetrating a center of the pair of transparent electrodes.

With this, even in the case of a transparent electrode having a larger area, a liquid crystal having a uniform planar surface can be formed.

Furthermore, a method for manufacturing a light deflector according to an aspect of the present invention includes: disposing a first transparent electrode; disposing a plurality of prisms which are provided above the first transparent electrode, and are arranged on an upper surface of the first transparent electrode; disposing two spacers provided above the first transparent electrode, and having, in an upper-lower direction, widths which are (i) greater than widths of the prisms and (ii) are identical to each other; dropping, from above the first transparent electrode, a liquid crystal into each of sections separated by the two spacers disposed; and disposing a second transparent electrode above the prisms and the two spacers.

With this, similar advantageous effects as the above-described light deflector can be produced.

Furthermore, a liquid crystal display according to an aspect of the present invention includes: the above-described light deflector; a backlight which emits light into the light deflector; and a liquid crystal panel into which the light emitted from the light deflector enters.

Furthermore, the liquid crystal display may further include a detection unit configured to detect a position of an eye of a viewer, wherein the light deflector may deflect the light toward the position of the eye detected by the detection unit.

Furthermore, it may be that the detection unit is configured to detect positions of a left eye and a right eye of the viewer, the light deflector is configured to deflect, on a time division basis, the light toward the positions of the left eye and the right eye detected by the detection unit, and the liquid crystal panel displays (i) an image for the left eye of the viewer, at a timing when the light is deflected toward the left eye, and (ii) an image for the right eye of the viewer, at a timing when the light is deflected toward the right eye.

The liquid crystal display including such a light deflector enables the viewer to see a stereoscopic image.

The following describes embodiments with reference to the drawings. Each of the embodiments described below shows a general or specific example. The numerical values, shapes, materials, structural elements, the arrangement and connection of the structural elements, steps, the processing order of the steps etc. shown in the following embodiments are mere examples, and therefore do not limit the scope of the present invention. Furthermore, among the structural elements in the following embodiments, structural elements not recited in any one of the independent claims defining the most generic part of the inventive concept are described as arbitrary structural elements.

Note that, the same reference signs are assigned to the same elements and there are cases where their descriptions are omitted. Furthermore, the drawings primarily illustrate the respective structural elements schematically in order to facilitate understanding.

Embodiment 1

Figure 2:
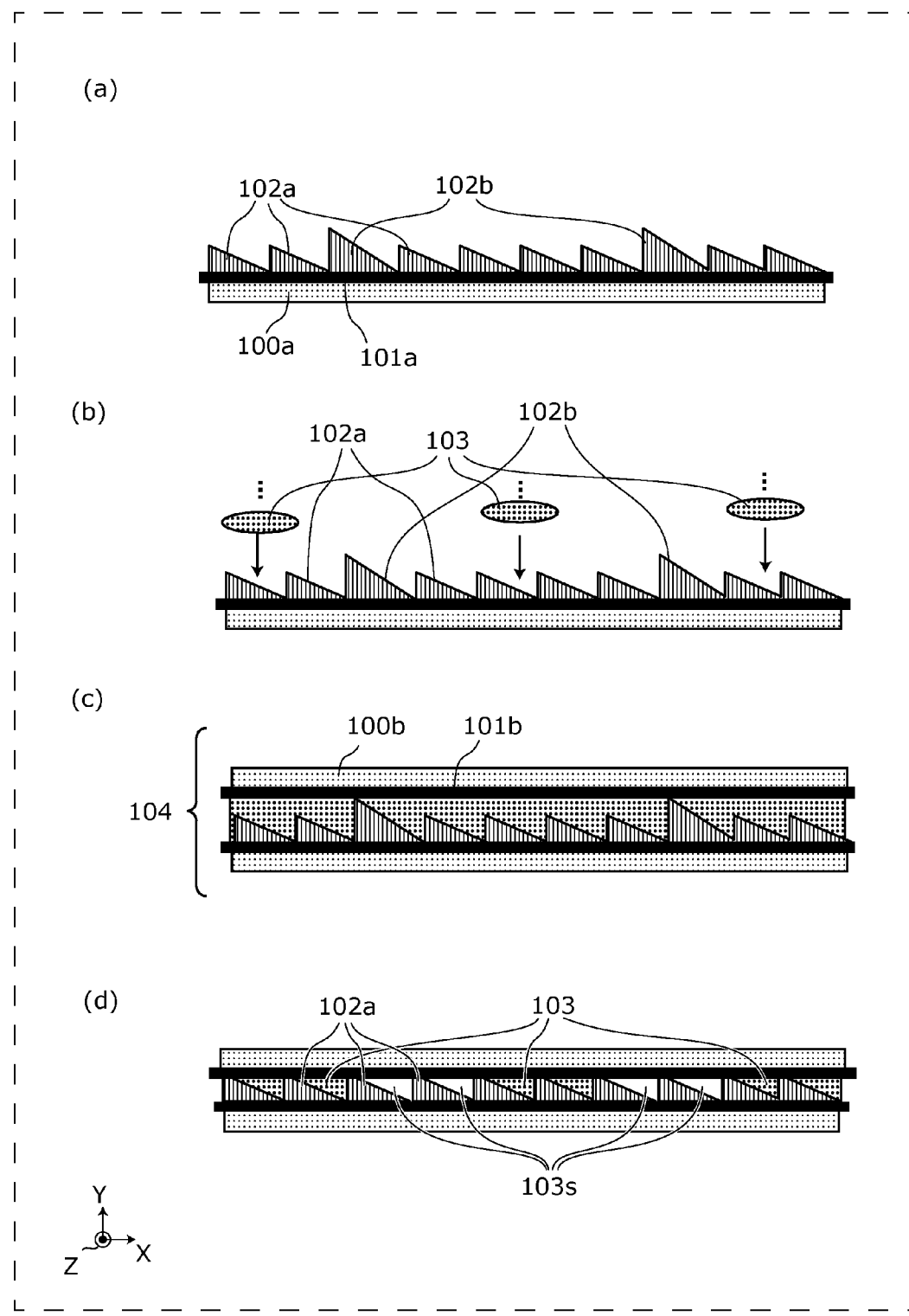
FIG. 2 shows diagrams illustrating a method of manufacturing a light deflector according to Embodiment 1.

FIG. 2 shows processes for manufacturing a light deflector 104 according to Embodiment 1. Note that the x-axis (X-direction), the y-axis (Y-direction), and the z-axis (Z-direction) are defined as shown by the axis of coordinates in FIG. 2, and the orientation of the axes are expressed with "+" or "−". More specifically, simple referring of the "X-axis direction" means both directions of a direction parallel to the X-axis, and referring of "+X-direction" means, among the directions parallel to the X-axis, a direction in which X increases (the direction pointed by the arrow of the axis of coordinates). Furthermore, the X-direction is also referred to as the horizontal direction, the Y-direction as the depth direction, and the Z-direction as the vertical direction.

The light deflector 104 includes: a lower glass board 100a, an upper glass board 100b, a lower indium in oxide (ITO) film 101a, and the upper ITO film 101b, prisms 102a and 102b, and liquid crystals 103. Note that, here, ITO is an abbreviation of an indium in oxide, and is widely used as a transparent electrode.

When manufacturing the light deflector 104, as shown in (a) in FIG. 2, the lower ITO film 101a is formed by vapor deposition or the like on the lower glass board 100a first, and then the prisms 102a and 102b are provided thereon. The prisms 102a may have an identical height or each of the prisms have a different height. The height (the width in the Y-direction) of each of the prisms 102b is greater than the highest one (the greatest height) of the prisms 102a. At least two prisms 102b are formed, and are characterized by having an identical height. In other words, two or more prisms 102b may be formed to have a height identical to each other. Here, "identical" means substantially identical, and does not only refer to the case of the precise match.

To manufacture the prisms 102a and 102b, in the case where the prisms 102a and 102b are resin for example, the prisms 102a and 102b may be formed by applying an ultraviolet curable resin on the lower ITO film 101a in advance, preparing a mold which is cut into shapes of the prisms 102a and 102b, and irradiating ultraviolet rays while transferring the shapes of the mold to the applied resin. As a matter of course, resin may also be directly cut into the shapes. For the prisms 102a and 102b, glass may be used. In this case, the prism shape may be formed using an etching technique or the like. A material and a method of manufacturing the prisms 102a and 102b may be determined as appropriate to suit the size or the required specification of the prisms 102a and 102b, and the material and the method are not limited here. Furthermore, a right triangle is used as an example of the shape of the base (cross-section) of the prisms 102a and 102b here. However, the shape is not particularly limited except for the cases where effects are specifically stated. Furthermore, intervals between the prisms 102a are, for example, approximately 10 µm, and the intervals between the prisms 102b are, for example, approximately a several centimeters. Note that, these values are examples, and the present invention is not limited to these values.

Note that, the prisms 102b need not necessarily be prisms as long as the prisms 102b (i) are arranged between the lower ITO film 101a and the upper ITO film 101b, and (ii) can regulate the space between the lower ITO film 101a and the upper ITO film 101b not to be narrower than a predetermined distance. More specifically, spacers having a height identical to the predetermined distance may be used in place of the prisms 102b. Unless otherwise noted, the following describes the case in which the prisms 102b are used as spacers.

Next, in (b) in FIG. 2, a liquid crystal 103 (liquid crystal material) is dropped on the prisms 102a manufactured in (a) in FIG. 2. Here the liquid crystals 103 are dropped onto sections separated by the prisms 102b which include at least two prisms 102b. In this state, the upper glass board 100b, which includes the upper ITO film 101b formed by vapor deposition or the like, is brought closer to the lower glass board 100a with the upper ITO film 101b on the side of the liquid crystal 103. In this manner, the liquid crystal 103 which is uniformly spread over the entirety of the light deflector 104 can be manufactured.

A hypothetical manufacturing method that is assumed when the above-described method is not used is described with reference to (d) in FIG. 2. It is assumed that the hypothetical manufacturing method does not include the prisms 102b, and all the prisms are the prisms 102a having an identical height. In this case, once a point where an upper ITO film and the prism 102a in contact with each other is formed while the liquid crystal is spreading from the position at which the liquid crystal is dropped, the liquid crystal cannot spread beyond the point of contact, as shown in (d) in FIG. 2. As a result, the liquid crystal localizes near the position on which the liquid crystal is dropped. This results in a problem that a space 103s which is not filled with the liquid crystal is created between the upper ITO film 101b and the lower ITO film 101a.

To address the above-described problem, the light deflector 104 according to this embodiment includes the prisms 102b having a height greater than the height of neighboring ones of the prisms 102a. Moreover, the light deflector 104 is manufactured by dropping the liquid crystal 103 into a space sectioned by the prisms 102b, and sandwiching the dropped liquid crystal between the upper glass board 100b and the lower glass board 100a. With this, a gap can be provided between the prisms 102a and the upper ITO film 101b, making it easy for the liquid crystal 103 to climb over the prisms 102a. As a result, the liquid crystal 103 can be uniformly spread over the entirety of the light deflector 104 in a simple manner. Furthermore, it is preferable that the difference between the height of the prisms 102a and the height of the prisms 102b be smallest in a range which allows the liquid crystal 103 to climb over. The reason is that the amount of the liquid crystal used can be reduced as the difference in height between the prisms 102a and 102b becomes smaller.

Figure 3:
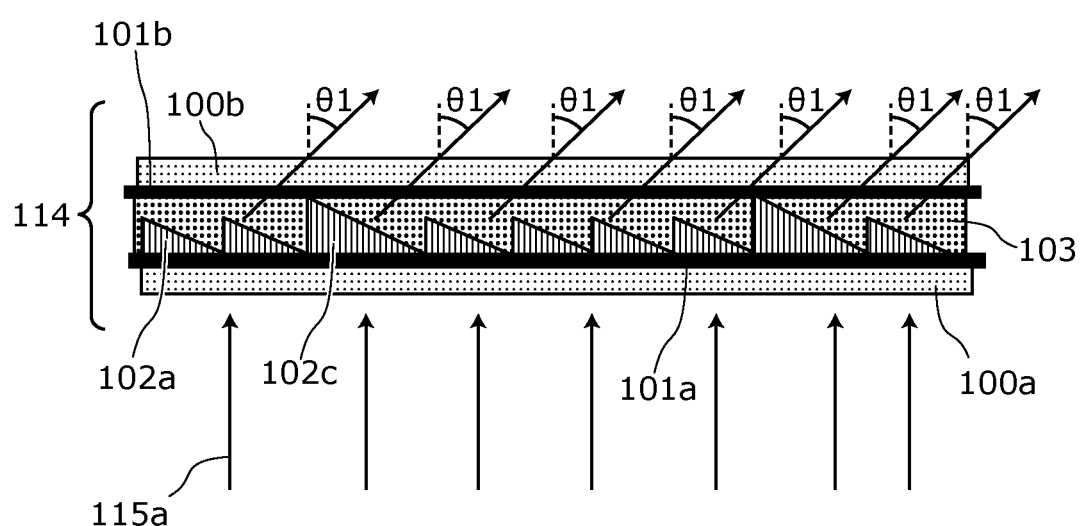
FIG. 3 is a diagram illustrating a deflection angle of the case in which the light deflector according to Embodiment 1 is used.

Furthermore, as a light deflector 114 in FIG. 3 shows, the shape of prisms 102c having a greater height than the prisms 102a may be similar to the shape of the prisms 102a. With this, the incident light can be deflected in a same direction by applying a same voltage to the liquid crystals 103 and the prisms 102a and 102c. For example, when light 115a vertically enters into the light deflector 114 as shown in FIG. 3, the light can be deflected by applying the same voltage irrespective of the positions. In other words, the voltage to be applied need not be changed corresponding to the positions, and the ITO film can be formed to have a simple solid pattern. Thus, the light deflector 114 can be configured simply and at a low cost. Although FIG. 3 shows the case in which the light 115a vertically enters into the light deflector 114, a similar advantageous effect can also be produced in the case where the light 115a enters into the light deflector 114 at a different angle, as a matter of course.

Furthermore, typically, periphery of a liquid crystal element is sealed with a sealing agent (e.g., epoxy resin) or the like. In view of this, as a light deflector 115 in FIG. 4 shows, prisms 102d having a greater height than the prisms 102a may be disposed at portions where sealing agents 105 are arranged. In this manner, when a prism is formed in a region which is sealed with the sealing agent 105 and the height of the prism in the sealed portion is greater, the thickness of the light deflector 115 can be easily controlled, and the liquid crystal 103 in an active area 106 can be uniformly spread. As a matter of course, the prisms 102d having a greater height may be arranged in the active area 106 of the light deflector 115. At this time, the prism 102d in the portion of the sealing agent 105 need not necessarily have a shape similar to the shape of the prisms 102a, and may have an arbitrary shape. Note that, here, the "active area" is a region through which light passes and the emitted light is recognized by the viewer. In contrast, the light which is emitted after passing through a region other than the active area does not enter the eye of the viewer, and is not recognized by the viewer.

Note that, the lower glass board 100a and the upper glass board 100b are used as transparent boards in this embodiment. However, this does not particularly limit to the use of glass boards. A resin board or the like which allows light to pass through may be used, and thus the transparent board is not limited to the glass board.

Furthermore, although the lower ITO film 101a and the upper ITO film 101b are used as transparent electrodes, this does not particularly limit the transparent electrodes to the ITO. As a matter of course, the transparent electrode may be a metal thin film, an indium zinc oxide (IZO), or the like, and is not limited to the ITO.

Embodiment 2

Figure 5:
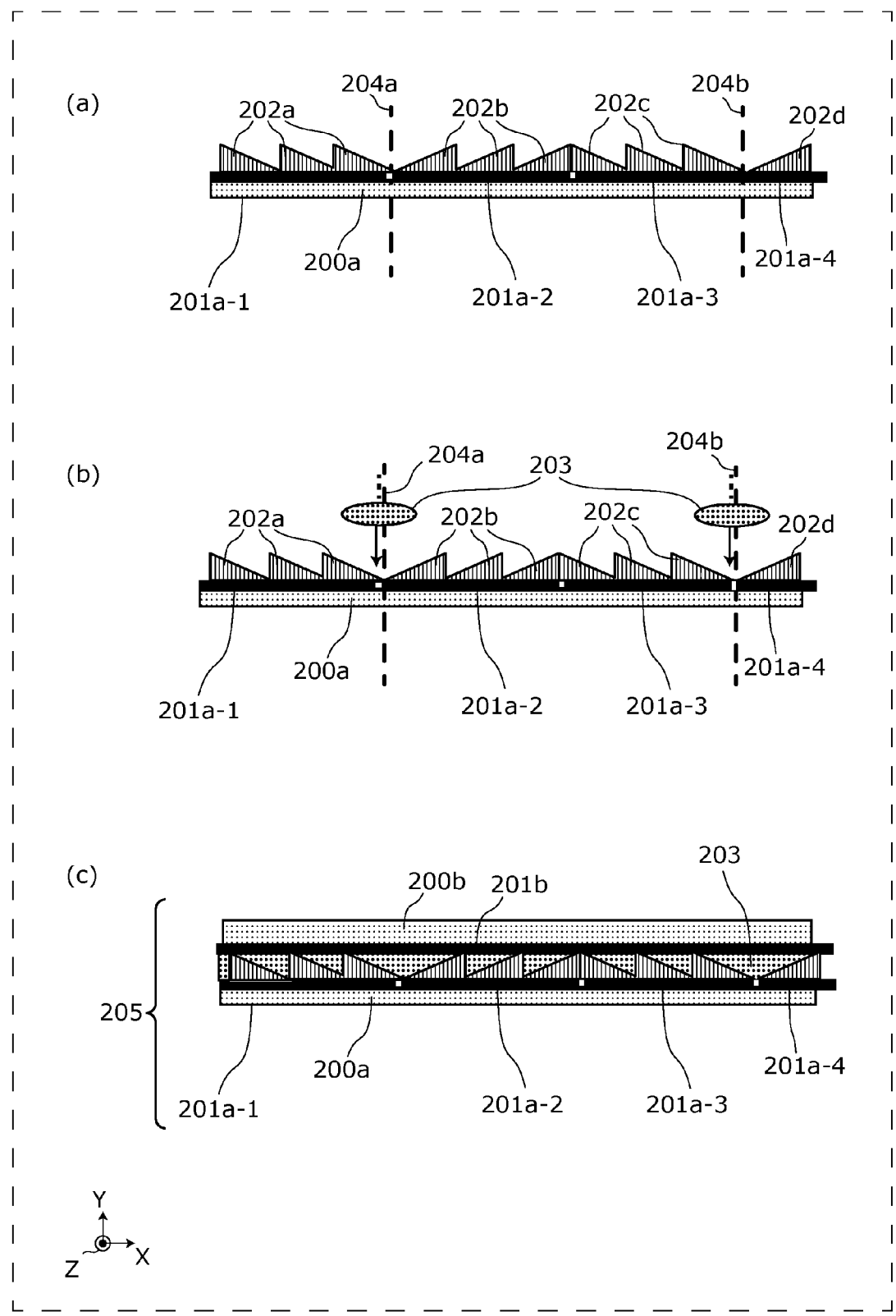
FIG. 5 shows diagrams illustrating a method of manufacturing a light deflector according to Embodiment 2.

FIG. 5 shows processes for manufacturing a light deflector 205 according to Embodiment 2. The light deflector 205 includes: a lower glass board 200a, an upper glass board 200b, lower ITO films 201a-1, 201a-2, 201a-3 and 201a-4, an upper ITO film 201b, prisms 202a, 202b, 202c and 202d, and a liquid crystals 203. The difference between the light deflector 205 and a light deflector 114 according to Embodiment 1 is that all the hypotenuses of the right triangles in cross-section of the prisms 102a and 102b in Embodiment 1 are facing toward an identical direction (upper right of the figure). On the other hand, in the light deflector 205 in Embodiment 2, the hypotenuses are facing toward the upper right corner in the prisms 202a, the upper left corner in the prisms 202b, the upper right corner in the prisms 202c, and the upper left corner in the prism 202d. More specifically, the prisms 202a and the prisms 202b have symmetrical shapes around an axis of symmetry 204a. Furthermore at least one of the prisms 202c and the prism 202d have symmetrical shapes around an axis of symmetry 204b.

First, as shown in (a) in FIG. 5, prisms 202a, 202b, 202c and 202d are manufactured around the axes of symmetry 204a and 204b, on the lower ITO films 201a-1, 201a-2, 201a-3, and 201a-4. The manufacturing method is the same as the method described in Embodiment 1. Next, as shown in (b) in FIG. 5, the liquid crystals 203 are dropped near axes of symmetry 204a and 204b. Furthermore, as shown in (c) in FIG. 5, the upper glass board 200b including the upper ITO film 201b formed by vapor deposition or the like is placed from the above of (b) in FIG. 5 to sandwich the liquid crystals 203, with the upper ITO film 201b on the side of the liquid crystal 203. With this, the liquid crystal 203 dropped near the axis of symmetry 204b may climb over the hypotenuse of each of the prisms when climbing over each of the prisms. This allows the liquid crystals 203 to climb over the prisms easily. Thus, the liquid crystals 203 are swiftly and uniformly filled between each of (i) the lower ITO films 201a-1, 201a-2, 201a-3, and 201a-4 and (ii) the upper ITO film 201b.

Note that, when the lower ITO are separated into, for example, lower ITOs 201a, 201b, 201c, and 201d to perform patterning and vapor deposition separately, and the prisms 202a, 202b, 202c, and 202d having the hypotenuses in an identical direction are manufactured on the lower ITOs 201a, 201b, 201c, and 201d, respectively, a different voltage can be applied to each of the prisms. This makes it possible to produce an advantageous effect that incident light can be deflected in an identical direction even when prisms having the hypotenuses on different positions are arranged.

Note that, although the shapes of all the prisms 202a, 202b, 202c, and 202d are right triangle here, the shape is not particularly limited as long as similar advantageous effects are produced. Here, descriptions are given using the right triangle, as an example which is most easy to understand and is effective.

Note that, FIG. 5 clearly illustrates a space between the lower ITO films 201a-1, 201a-2, 201a-3, and 201a-4 to make it clear that these ITO films are not the same electrode. However, in reality, it is preferable that the space be as narrow as possible, and be 10 micrometers or smaller.

Figure 6:
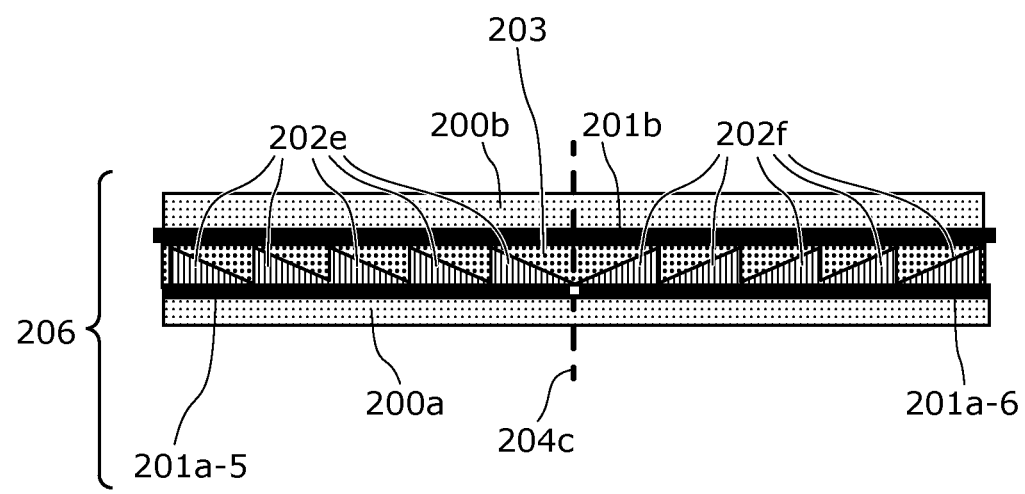
FIG. 6 is a schematic configuration diagram of the light deflector according to Embodiment 2.

Furthermore, FIG. 6 shows that prisms 202e and 202f are arranged to be symmetrical around an axis of symmetry 204c which is located at substantially the center of a cross section of a light deflector 206, the hypotenuses of the prisms 202e are on the direction of the axis of symmetry 204c, and the hypotenuses of the prisms 202f are also on the direction of the axis of symmetry 204c. With this arrangement, when manufacturing the light deflector 206, the liquid crystal 203 only needs to be dropped near the axis of symmetry 204c of the light deflector 206, which is advantageous in that the light deflector 206 can be manufactured in a significantly simple manner.

Next, an angle of refraction θ when a refractive index N of the liquid crystal 203 is changed relative to an refractive index N0 of a prism 202g is described with reference to FIG. 7. As shown in (a) in FIG. 7, an angle φ of a prism is defined to allow the hypotenuse of the prism to be positioned on the upper right of the prism. Here, it is assumed that φ=45 degrees, for example. Furthermore, the solid line in (b) in FIG. 7 shows a relationship between a difference in refractive index (N−N0) and an angle of refraction, when it is assumed that an refractive index N0 of the prism is 1.7, and an emission angle from the upper glass board 200b is assumed to be positive (plus) in the right direction in the figure. The dotted line is extrapolated and is a slope of the solid line when the difference in refractive index is in the vicinity of 0. The relationship between the difference in refractive index (N−N0) and the angle of refraction indicates that the linearity deteriorates as an absolute value of the difference in refractive index increases. In particular, the graph indicates that deterioration in linearity is significant when an angle of refraction θ is on a side of minus (i.e., refractive index N of the liquid crystal 203 is smaller than refractive index N0 of the prism 202g). Therefore, as shown by a liquid crystal display device 207 in (a) in FIG. 8, when a light deflector 10a of the liquid crystal display device 20 shown in (c) in FIG. 1 is configured using the light deflector 206 shown in (a) in FIG. 6, the light deflector 10a can perform deflection with a small divergence for a right eye 26a and a left eye 26b of a viewer 26 even in the case of light which is deflected from the vicinity of the side surface of a liquid crystal panel 22. Thus, it becomes possible to configure the liquid crystal display device 207 having high picture quality. Furthermore, a light deflector 208 shown in (b) in FIG. 8 may be used in place of the light deflector 206 of the liquid crystal display device 207. The lower ITO film of the light deflector 208 is separated into 8 parts, namely, 201a-8 to 201a-14, and widths of the ITO films narrow as the side surfaces are approached away from the center. As with the liquid crystal display device according to this embodiment, deflection angle of light increases at portions closer to the side surfaces of the light deflector 208. However, when the widths of the ITO films are the same or become narrower as the side surfaces are approached away from the center, the voltage to be applied can be more accurately corrected as the side surfaces are approached away from the center. This makes it possible to accurately correct the divergence in linearity, and perform deflection toward the right eye 26a and the left eye 26b of the viewer 26 with a further reduced divergence. Thus, the liquid crystal display device 207 having even higher picture quality can be configured.

Furthermore, as shown in (a) in FIG. 9, a liquid crystal display device 211 may include a Fresnel lens 210 in a stage subsequent to the light deflector 206. Fresnel lens 210 can reduce an angle of light required to be deflected by the light deflector 206. In particular, the Fresnel lens 210 can reduce an angle of light to be deflected in the periphery portion of the light deflector 206. Then, it is possible for the light deflector 206 to perform deflection at approximately the same angle over the entire surface. With this, the requirement specification on variation in refractive index of the liquid crystal that is used in the light deflector 206 can be lowered. Furthermore, the light deflector 206 can be configured at low cost. Furthermore, the light deflector 206 enables lowering of the voltage to be applied to the liquid crystal, which is advantageous in that configuration at low cost can be realized including a drive circuit. Furthermore, as shown in (b) in FIG. 7, the linearity of the difference in refractive index and an angle of refraction is good when the difference in refractive index is small. When the required difference in refractive index is small, it is sufficient that the refractive index of the liquid crystal 203 be varied approximately linearly relative to the position of the viewer 26. This is advantageous in that the controlling becomes easy. (b) in FIG. 9 shows a relationship between an angle of prism ψ and an angle of deflection a of the Fresnel lens shown in (c) in FIG. 9. In the graph shown in (b) in FIG. 9, the solid line shows a relationship between an angle of prism and an angle of refraction, and the dotted line is extrapolated to show a relationship between an angle of prism and an angle of refraction when the angle of the prism is in the vicinity of 0. In the Fresnel lens, relationship of an angle of prism and an angle of refraction is not linear when the angle of prism increases, as with the light deflector 206. Thus, when using, in the liquid crystal display device 211, the light deflector 208 in place of the light deflector 206, it is possible to control a refractive index more accurately in regions in which the Fresnel lens 210 has a particularly deteriorated linearity that are regions closer to the side surfaces of the Fresnel lens. Furthermore, with the light deflector 208, the liquid crystal display device 211 has ITO films that have an identical width or widths which are narrower as the side surfaces are approached away from the center. With this, deterioration of linearity of the Fresnel lens 210 or the linearity of the light deflector 206 itself can be corrected, making it possible to configure a stereoscopic image display device or a liquid crystal display device with high picture quality having reduced crosstalk.

Note that, although the Fresnel lens 210 is disposed in a stage subsequent to the light deflector 206 in (a) in FIG. 9, the Fresnel lens 210 may be disposed in a stage before the light deflector 206 as a matter of course. Here, the position of the Fresnel lens 210 is not limited.

Figure 8:
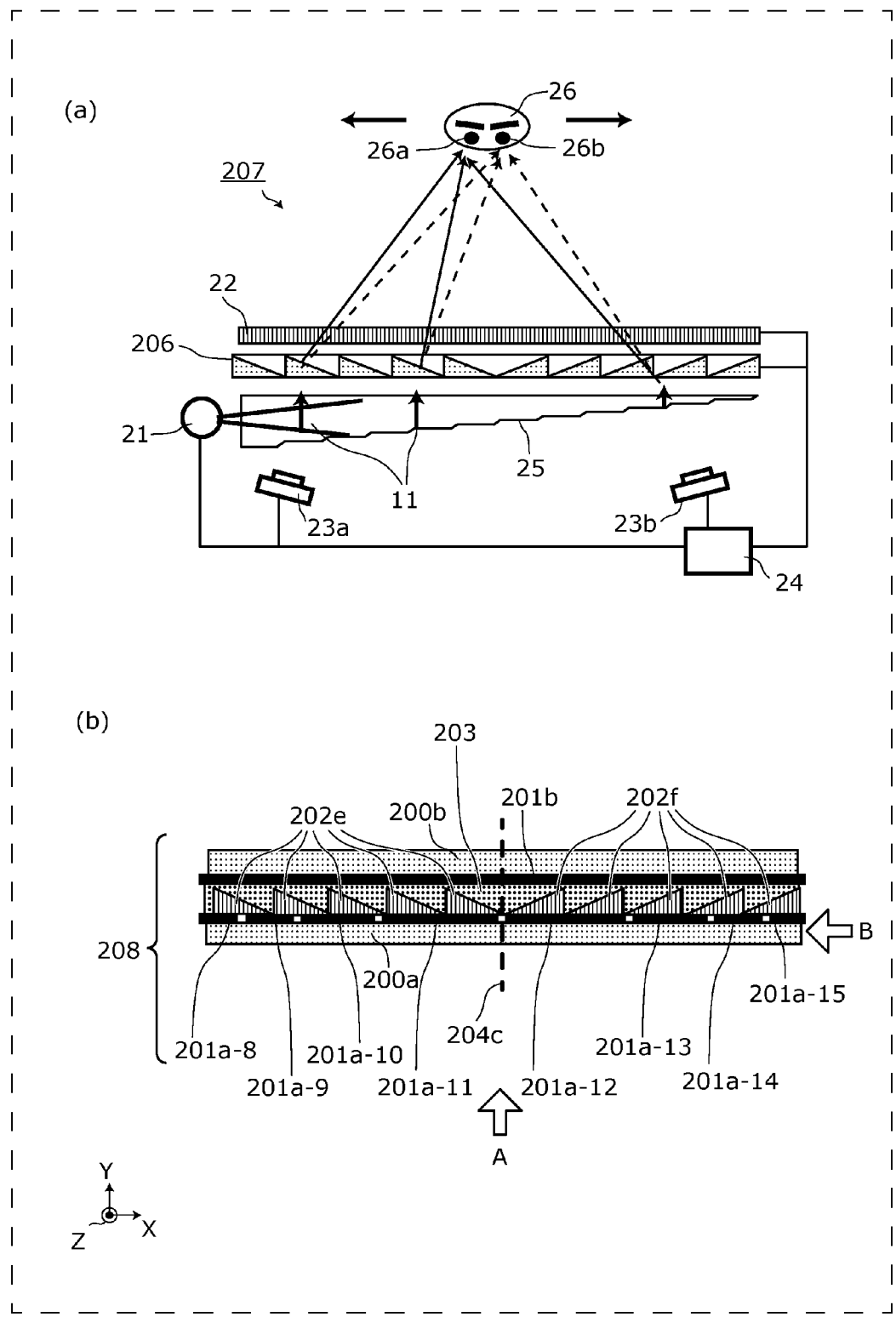
FIG. 8 shows a conceptual diagram of a liquid crystal display device using the light deflector according to Embodiment 2, and a schematic configuration diagram of the light deflector.
Figure 10:
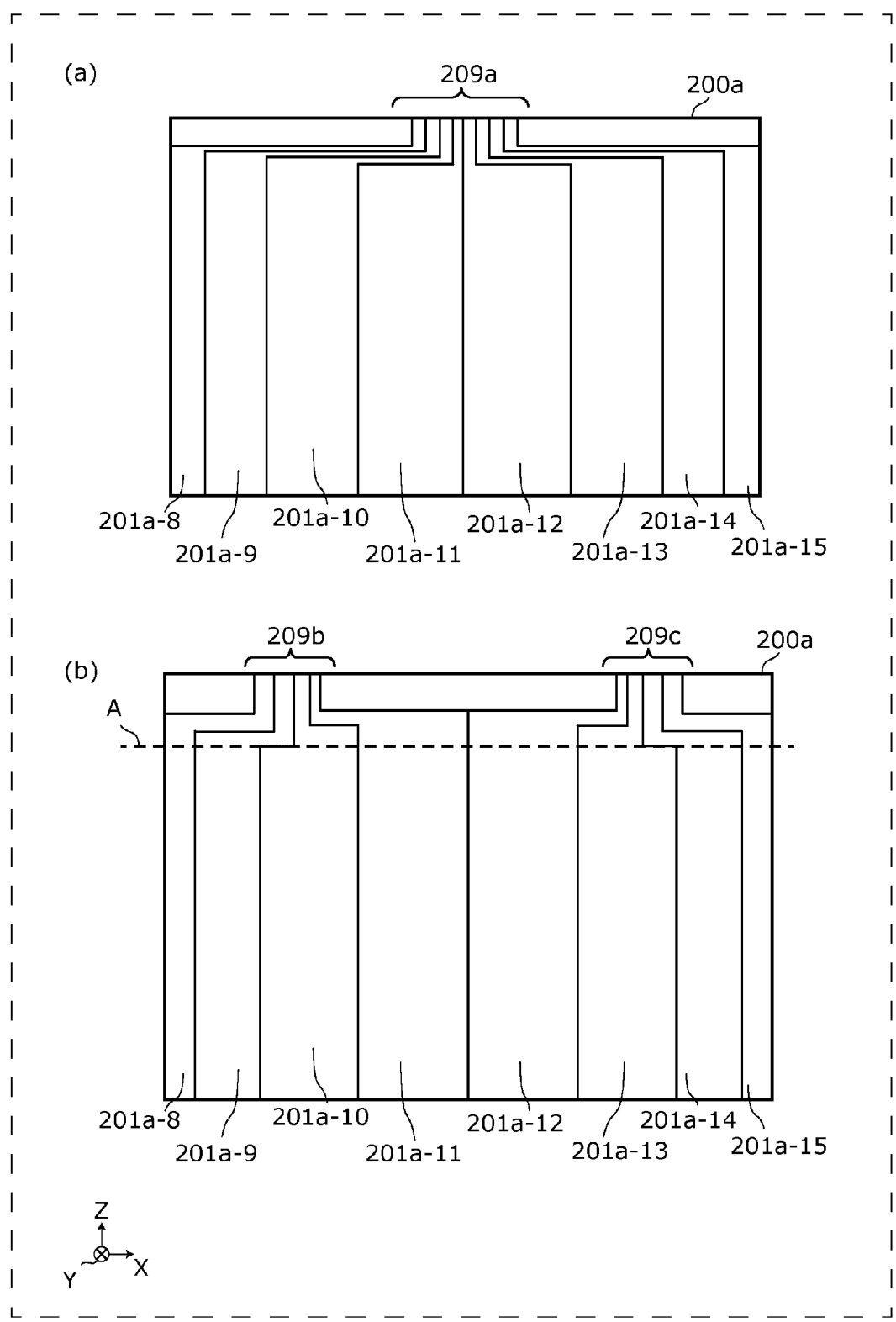
FIG. 10 schematically shows a first wiring diagram and a second wiring diagram of an ITO film used in the light deflector according to Embodiment 2.

Next, FIG. 10 is a diagram showing the lower ITO films 201a-8 to 201a-14 provided on the lower glass board 200a in FIG. 8, from the direction of arrow A in FIG. 8. The lower ITO film 201a-8 to a lower ITO film 201a-15 are bundled together in a port 209a, and are connected to the control unit 24. The lower ITO 201a-8 to 201a-15 may be bundled together in two positions, namely, ports 209b and 209c, as shown in (b) in FIG. 10. With this, in total, distances from the port 209b to each of the portions where the lower ITO films 201a-8 to 201a-11 have greatest widths (portions crossing broken line A in (b) in FIG. 10) is smaller than when the number of the port is one. Furthermore, variation in distance between the port and each of the lower ITO films 201a-8 to 201a-11 becomes smaller. Furthermore, the same applies to the port 209c and the lower ITO films 201a-12 to 201a-15. With this, in total, resistance between one of the ports and each of the lower ITOs 201a-8 to 201a-15 is smaller, and thus the time constant when the liquid crystal is driven becomes small. With this, it becomes possible to drive the liquid crystal at high speed, and reduce the variation in resistance values of the lower ITO films 201a-8 to 201a-15. This reduces variation in speed in driving the liquid crystal, which depends on the positions on the liquid crystal panel 22. With this, the liquid crystal display device 207 having high picture quality can be configured.

Furthermore, as shown in (a) in FIG. 11, ports 209d and 209e may be provided in two portions, that is, on the upper portion and the lower portion. In this case, the lower ITO films need to be connected, by cables, to the control unit 24 from the two ports 209d and 209e which are on the upper portion and the lower portion, respectively. For example, as shown in (b) in FIG. 11, ports 209f and 209g can be arranged on the same side by arranging the ITO film on the upper surface and the lower surface of the lower glass board 200a. Here, (b) in FIG. 11 is a diagram showing the lower ITO films 201a-8 to 201a-15, which are formed on the lower glass board 200a, from the direction of arrow B in FIG. 8. With this, the lower ITO films can be connected to the control unit 24 from the closely arranged ports 209f and 209g. With this, wiring distance is short and the wiring resistance is low, and the driving speed of the liquid crystal can be increased. Furthermore, this makes it possible to configure the liquid crystal display device 207 having a small device size.

Note that, the light deflector 205 described in this embodiment can also be realized by adding its features to a light deflector 104 according to Embodiment 1 or can also be realized with only the features of the light deflector 205.

Stated differently, the light deflector 205 described in this embodiment is a light deflector which deflects incident light and emits the light which has been deflected, by modulating a refractive index of a liquid crystal, and the light deflector includes: a pair of transparent electrodes which face each other; a plurality of prisms which are provided between the pair of transparent electrodes and are arranged on a facing surface of one of the pair of transparent electrodes, the facing surface facing a surface of the other one of the pair of transparent electrodes; and a liquid crystal which is provided, within a space between the pair of transparent electrodes, in a portion other than a portion where the prisms and two spacers exist, and each of the prisms has a symmetrical shape with respect to an axis of symmetry which is parallel to a normal to the facing surface.

Furthermore, stated differently, the method for manufacturing the light deflector 205 described in this embodiment includes: disposing a first transparent electrode; disposing a plurality of prisms which are provided above the first transparent electrode, and are arranged on an upper surface of the first transparent electrode; dropping, from above the first transparent electrode, a liquid crystal into each of sections separated by the two spacers disposed; and disposing a second transparent electrode above the prisms and the two spacers, and each of the prisms has a symmetrical shape with respect to an axis of symmetry which is parallel to a normal to the upper surface of the first transparent electrode.

Embodiment 3

Figure 12:
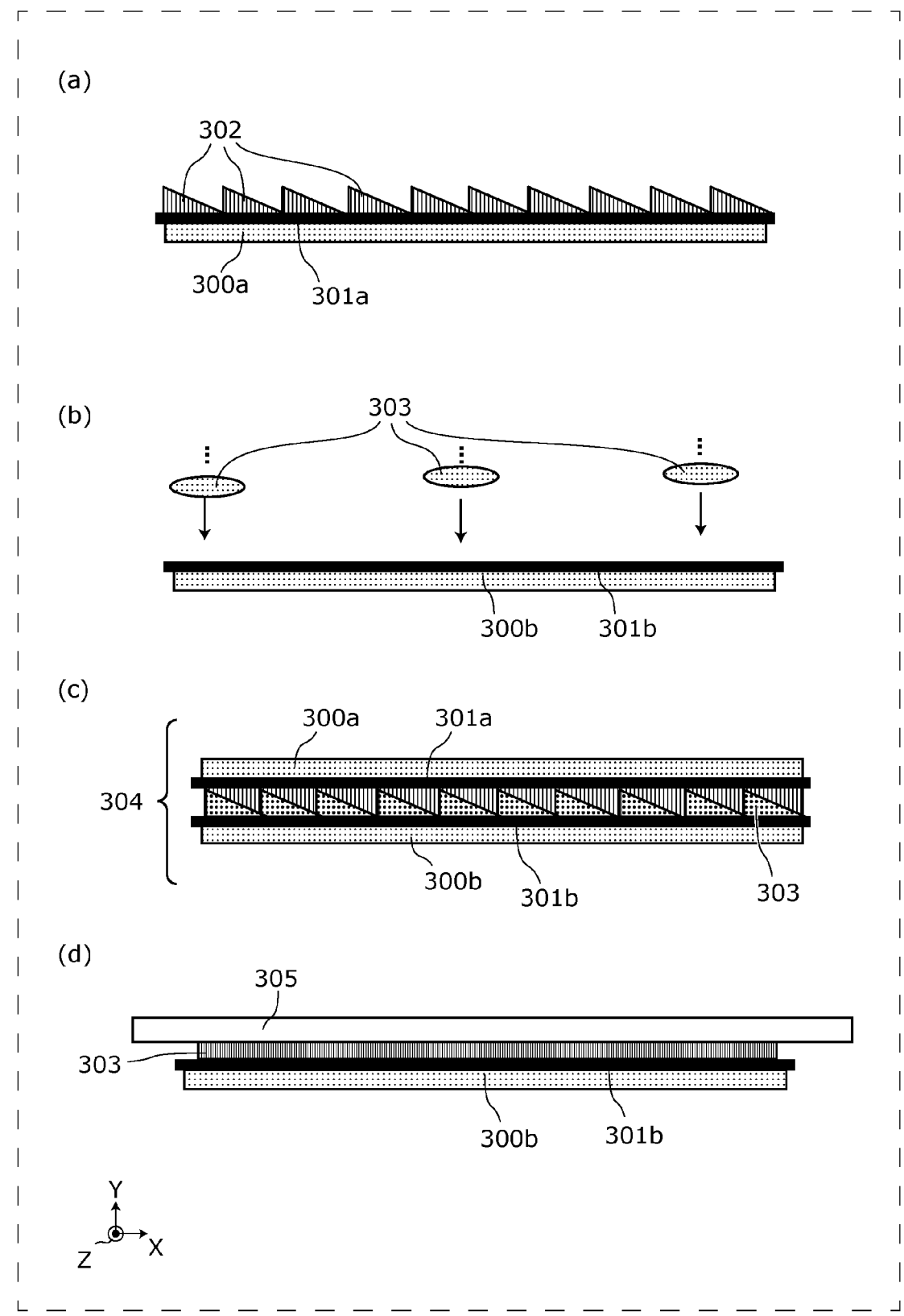
FIG. 12 shows diagrams illustrating a method of manufacturing a light deflector according to Embodiment 3.

FIG. 12 shows processes for manufacturing a light deflector 304 according to Embodiment 3. The light deflector 304 includes: a lower glass board 300a, an upper glass board 300b, a lower ITO film 301a, an upper ITO film 301b, prisms 302, and liquid crystals 303.

First, as shown in (a) in FIG. 12, as with the light deflector 104, the prisms 302 are arranged above the lower glass board 300a on which the lower ITO 301a has been vapor deposited. Next, the upper glass board 300b on which the upper ITO film 301b has been vapor deposited is placed with the upper ITO film 301b on the upper side. Then, the liquid crystals 303 are dropped onto the upper ITO film 301b.

Furthermore, the lower glass board 300a including the prisms 302 is flipped to achieve the state in which the prisms 302 are oriented downward, and the lower glass board 300a and the upper glass board 300b on which the liquid crystals have been dropped are pressed together. With this, the liquid crystal 303 need not climb the wall of the prism 302 and can be uniformly spread over the entirety of the light deflector 304. Furthermore, in a stage before the liquid crystals 303 are sandwiched between the upper glass board 300b and the lower glass board 300a, a flat board 305 or the like may be brought into contact with the liquid crystals 303 on the upper glass board 300b to spread the liquid crystals 303 over the surface, as shown in (d) in FIG. 12. This makes it possible to spread the liquid crystals over the entirety of the light deflector 304 more uniformly. Although the flat board 305 is used here as an example, the present invention is not limited to the use of the flat board 305, as long as similar advantageous effects are produced.

Figure 13:
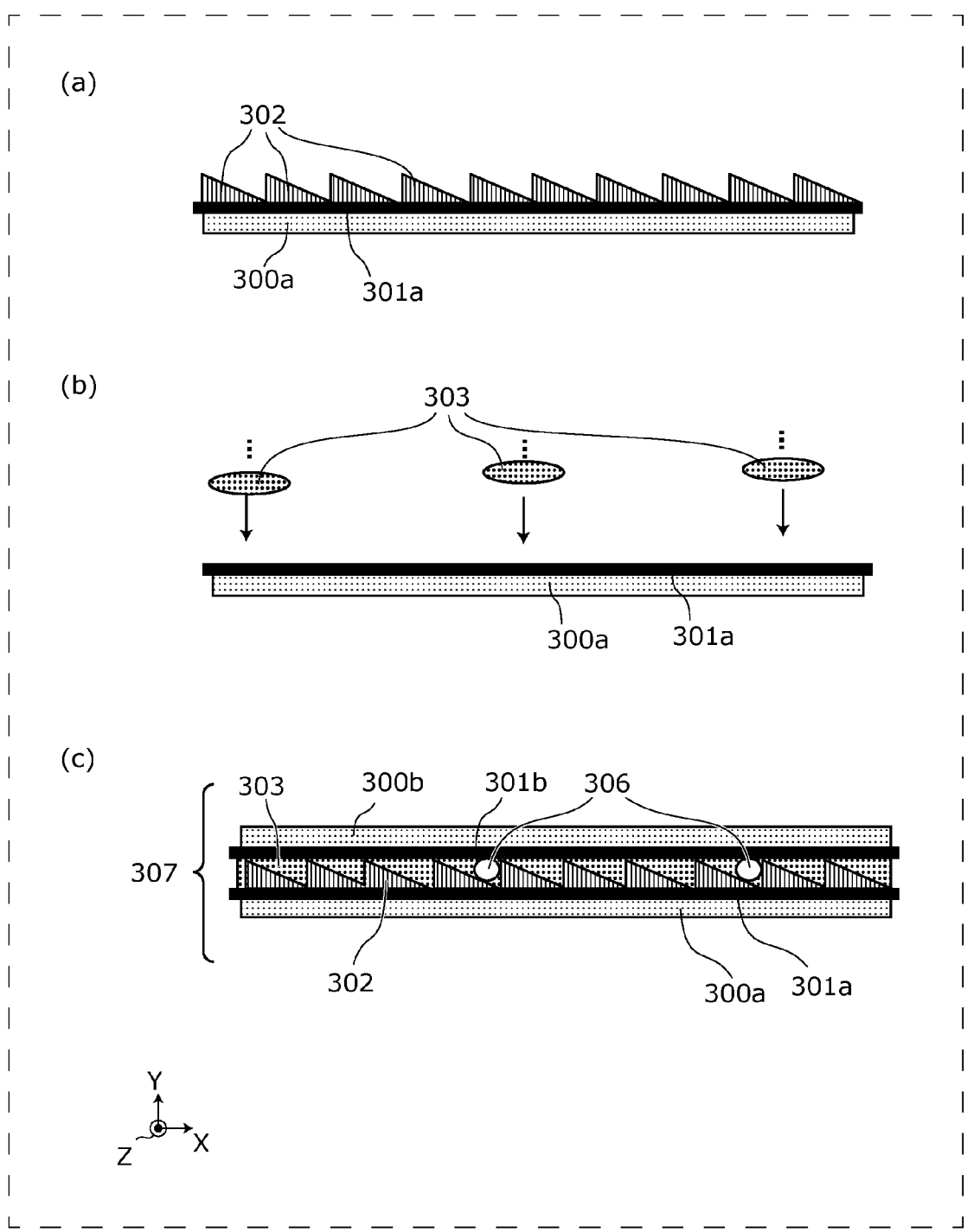
FIG. 13 shows diagrams illustrating a method of manufacturing the light deflector according to Embodiment 3.

Furthermore, FIG. 13 shows processes for manufacturing a light deflector 307. As shown in (a) in FIG. 13, the light deflector 307 is the same as the light deflector 304 shown in (a) in FIG. 12 up to the provision of the prisms 302 above the lower glass board 300a on which the lower ITO film 301a has been vapor deposited. In the light deflector 307, the liquid crystal 303 is directly dropped onto the lower glass board 300a including the prisms 302. At this time, beads 306 may also be enclosed. With this, the bead 306 provide a predetermined space between the prisms 302 and the upper ITO film 301b as shown in (c) in FIG. 13, and thus the liquid crystals 303 can be uniformly spread over the entirety of the light deflector 304. At this time, the liquid crystals 303 having high kinematic viscosity do not allow the beads 306 to fit deep into the spaces between the prisms 302, which causes cell gaps to be uneven. Thus, it is preferable that the kinematic viscosity of the liquid crystal be equal to or less than 40 mm²/s. In this case, the beads 306 and the prisms 302 correspond to the spacers.

Note that, the configurations shown in the above embodiments are examples, and it goes without saying that various modifications can be carried out without departing from the essence of the inventive concept. Furthermore, the above-described embodiments or inventions resulting from modifications thereof can be combined with each other and used, as a matter of course.

INDUSTRIAL APPLICABILITY

A light deflector according to the present invention can simply and uniformly spread a liquid crystal in a surface of the light deflector, and thus it is possible to configure an inexpensive light deflector. Furthermore, a liquid crystal display device configured using the light deflector makes it possible to configure a simple 3D liquid crystal display device, a "privacy display", or the like, having high picture quality, and thus is useful.

REFERENCE SIGNS LIST 10, 10a, 104, 114, 115, 205, 206, 208, 304, 307 Light deflector
11, 11h, 11s, 11m, 115a Light
12 Liquid crystal
13 Dielectric
14a, 14b, 14c Electrode
20, 207, 211 Liquid crystal display device
21 Light source
22 Liquid crystal panel
23a, 23b Stereo camera
24 Control unit
25 Light guide plate
26 Viewer
26a Right eye
26b Left eye
100a, 200a, 300a Lower glass board
100b, 200b, 300b Upper glass board
101a, 201a-1 to 201a-15, 301a Lower ITO film
101b, 201b, 201c, 301b Upper ITO film
102a, 102c, 102d, 202a, 202b, 202c, 202d, 202e, 202f, 202g, 302 Prism
102b Prism (spacer)
103, 203, 303 Liquid crystal
103s Space
105 Sealing agent
106 Active area
204a, 204b, 204c Axis of symmetry
209a, 209b, 209c, 209d, 209e, 209f, 209g Port
210 Fresnel lens
305 Flat board
306 Bead

The invention claimed is:

1. A light deflector which deflects incident light and emits the light which has been deflected, by changing a refractive index of a liquid crystal, the light deflector comprising:
   a pair of transparent electrodes which face each other;
   a plurality of prisms which are provided between the pair of transparent electrodes and are arranged on a facing surface of one of the pair of transparent electrodes, the facing surface facing a surface of the other one of the pair of transparent electrodes;
   two spacers arranged between the pair of transparent electrodes, and having, in a direction from one of the pair of transparent electrodes toward the other of the pair of transparent electrodes, widths which (i) are greater than widths of the prisms and (ii) are identical to each other; and
   a liquid crystal which is provided, within a space between the pair of transparent electrodes, in a portion other than a portion where the prisms and the two spacers exist,
   wherein each of the two spacers has:
   a portion in contact with the facing surface of one of the pair of transparent electrodes, and another portion in contact with the surface of the other one of the pair of transparent electrodes; and
   a shape similar to a shape of each of the prisms of the light deflector, such that each of the spacers can deflect incident light from a light source in a similar manner as the prisms.

2. The light deflector according to claim 1,
   wherein the two spacers are two prisms.

3. The light deflector according to claim 1, further comprising
   a sealing agent which seals an edge of the pair of transparent electrodes,
   wherein each of the two spacers is disposed at a position in contact with the sealing agent.

4. The light deflector according to claim 1,
   wherein each of the prisms has a symmetrical shape with respect to an axis of symmetry which is parallel to a normal to the facing surface.

5. The light deflector according to claim 4,
   wherein each of the prisms has a stick-like shape and has a right triangle-shaped cross-section, and
   a non-hypotenuse side of the right triangle is in contact with the facing surface, and a side closer to the axis of symmetry out of two sides different from the non-hypotenuse side is the hypotenuse.

6. The light deflector according to claim 4,
wherein, in a cross-section of the prisms, the axis of symmetry is at a position penetrating a center of the pair of transparent electrodes.

7. A method for manufacturing a light deflector, the method comprising:
  disposing a first transparent electrode;
  disposing a plurality of prisms which are provided above the first transparent electrode, and are arranged on an upper surface of the first transparent electrode;
  disposing two spacers provided above the first transparent electrode, and having, in an upper-lower direction, widths which are (i) greater than widths of the prisms and (ii) are identical to each other;
  dropping, from above the first transparent electrode, a liquid crystal into each of sections separated by the two spacers disposed; and
  disposing a second transparent electrode above the prisms and the two spacers,
  wherein each of the two spacers has:
  a portion in contact with a facing surface of one of the first transparent electrode and the second transparent electrode, and another portion in contact with a facing surface of the other one of the first transparent electrode and the second transparent electrode; and
  a shape similar to a shape of each of the prisms of the light deflector, such that each of the spacers can deflect incident light from a light source in a similar manner as the prisms.

8. A liquid crystal display comprising:
  the light deflector according to claim 1;
  a backlight which emits light into the light deflector; and
  a liquid crystal panel into which the light emitted from the light deflector enters.

9. The liquid crystal display according to claim 8, further comprising:
  a detection unit configured to detect a position of an eye of a viewer,
  wherein the light deflector deflects the light toward the position of the eye detected by the detection unit.

10. The liquid crystal display according to claim 9,
  wherein the detection unit is configured to detect positions of a left eye and a right eye of the viewer,
  the light deflector is configured to deflect, on a time division basis, the light toward the positions of the left eye and the right eye detected by the detection unit, and
  the liquid crystal panel displays (i) an image for the left eye of the viewer, at a timing when the light is deflected toward the left eye, and (ii) an image for the right eye of the viewer, at a timing when the light is deflected toward the right eye.

* * * * *